US011900562B2

(12) United States Patent
Braunreiter

(10) Patent No.: US 11,900,562 B2
(45) Date of Patent: Feb. 13, 2024

(54) SUPER-RESOLUTION AUTOMATIC TARGET AIMPOINT RECOGNITION AND TRACKING

(71) Applicant: Raytheon Company, Waltham, MA (US)

(72) Inventor: Dennis C. Braunreiter, San Diego, CA (US)

(73) Assignee: Raytheon Company, Tewksbury, MA (US)

( * ) Notice: Subject to any disclaimer, the term of this patent is extended or adjusted under 35 U.S.C. 154(b) by 147 days.

(21) Appl. No.: 16/702,279

(22) Filed: Dec. 3, 2019

(65) Prior Publication Data

US 2021/0383506 A1  Dec. 9, 2021

Related U.S. Application Data

(63) Continuation-in-part of application No. 16/674,995, filed on Nov. 5, 2019.

(51) Int. Cl.
*H04N 5/232* (2006.01)
*G06T 3/40* (2006.01)
*G06T 5/50* (2006.01)

(52) U.S. Cl.
CPC .......... *G06T 3/4053* (2013.01); *G06T 3/4069* (2013.01); *G06T 3/4076* (2013.01); *G06T 5/50* (2013.01); *G06T 2207/10016* (2013.01)

(58) Field of Classification Search
CPC .. H04N 5/2256; H04N 5/23232; G01S 17/58; G01S 17/32; G01S 7/4817; G06T 7/20
See application file for complete search history.

(56) References Cited

U.S. PATENT DOCUMENTS

| 5,557,347 A | 9/1996 | Johnson |
| 5,780,839 A | 7/1998 | Livingston |
| 5,936,229 A | 8/1999 | Livingston |

(Continued)

FOREIGN PATENT DOCUMENTS

| EP | 2793191 A2 * | 10/2014 | ............. H04N 5/332 |
| JP | 3041283 B2 | 5/2000 | |

OTHER PUBLICATIONS

Higgs et al., "Atmospheric Compensation and Tracking Using Active Illumination," Lincoln Laboratory Journal, vol. 11, Nov. 1998, 22 pages.

(Continued)

*Primary Examiner* — Jonathan R Messmore

(57) ABSTRACT

A system includes at least one imaging sensor configured to capture images of a target. The system also includes at least one controller configured to generate super-resolution images of the target using the captured images and identify multiple edges of the target using the super-resolution images. The at least one controller is also configured to identify an aimpoint on the target based on the identified edges of the target. In addition, the at least one controller is configured to update the aimpoint on the target as the target moves over time. The system may further include a high-energy laser (HEL) configured to generate an HEL beam that is directed towards the target, and the at least one controller may be configured to adjust one or more optical devices to direct the HEL beam at the identified aimpoint on the target.

21 Claims, 7 Drawing Sheets

(56) References Cited

U.S. PATENT DOCUMENTS

| | | | |
|---|---|---|---|
| 6,115,123 | A | 9/2000 | Stappaerts et al. |
| 6,364,835 | B1* | 4/2002 | Hossack ............. G01S 7/52085 |
| | | | 600/443 |
| 7,041,953 | B2 | 5/2006 | Byren |
| 8,049,870 | B2 | 11/2011 | Mosier et al. |
| 8,218,589 | B1 | 7/2012 | Saunders |
| 8,415,600 | B2 | 4/2013 | Hutchin |
| 8,853,604 | B1 | 10/2014 | Barchers |
| 9,368,936 | B1 | 6/2016 | Lenius et al. |
| 10,113,908 | B1 | 10/2018 | Marx et al. |
| 10,565,684 | B2* | 2/2020 | Zhang ...................... G06F 16/51 |
| 10,798,298 | B1 | 10/2020 | Tarifa |
| 11,017,560 | B1 | 5/2021 | Gafni et al. |
| 2005/0057664 | A1* | 3/2005 | Palum ...................... H04N 25/41 |
| | | | 348/222.1 |
| 2006/0022115 | A1 | 2/2006 | Byren |
| 2006/0126952 | A1* | 6/2006 | Suzuki ................... H04N 19/61 |
| | | | 382/233 |
| 2007/0217705 | A1* | 9/2007 | Lee ........................ H04N 19/86 |
| | | | 382/251 |
| 2009/0092337 | A1 | 4/2009 | Nagumo |
| 2010/0283988 | A1* | 11/2010 | Mosier ...................... F41G 5/08 |
| | | | 356/4.01 |
| 2012/0268309 | A1 | 10/2012 | Samuel et al. |
| 2012/0297969 | A1 | 11/2012 | King et al. |
| 2013/0010100 | A1* | 1/2013 | Kotaki ................... G01B 15/04 |
| | | | 348/80 |
| 2016/0086018 | A1 | 3/2016 | Lemoff |
| 2016/0184924 | A1 | 6/2016 | Kalender et al. |
| 2016/0247262 | A1* | 8/2016 | Li .............................. G06T 5/20 |
| 2016/0295208 | A1* | 10/2016 | Beall ......................... G06T 7/20 |
| 2017/0192094 | A1 | 7/2017 | Marron et al. |
| 2017/0261743 | A1 | 9/2017 | Kim et al. |
| 2017/0358095 | A1* | 12/2017 | Levy ..................... A61B 5/0036 |
| 2018/0307815 | A1 | 10/2018 | Samadani et al. |
| 2021/0019921 | A1* | 1/2021 | Yoshida ................. G03B 17/18 |
| 2021/0156969 | A1 | 5/2021 | Levy et al. |

OTHER PUBLICATIONS

Chen et al, "Advanced image registration techniques and applications," Proceedings of SPIE 6979, Independent Component Analyses, Wavelets, Unsupervised Nano-Biometric Sensors, and Neural Networks VI, Apr. 2008, 15 pages.

Chen et al, "Advanced super-resolution image enhancement process," Proceedings of SPIE 7073, Applications of Digital Image Processing XXXI, Sep. 2008, 11 pages.

Braunreiter et al., U.S. Appl. No. 16/559,136 entitled "System and Method for Correcting for Atmospheric Jitter and High Energy Laser Broadband Interference Using Fast Steering Mirrors" filed on Sep. 3, 2019, 29 pages.

Braunreiter et al., U.S. Appl. No. 16/596,595 entitled "System and Method for Predictive Compensation of Uplink Laser Beam Atmospheric Jitter for High Energy Laser Weapon Systems" filed on Oct. 8, 2019, 27 pages.

Braunreiter et al., U.S. Appl. No. 16/674,995 entitled "Atmospheric Jitter Correction and Target Tracking Using Single Imaging Sensor in High-Energy Laser Systems" filed on Nov. 5, 2019, 51 pages.

International Search Report dated Apr. 1, 2021 in connection with International Patent Application No. PCT/US2020/040571, 3 pages.

Written Opinion of the International Searching Authority dated Apr. 1, 2021 in connection with International Patent Application No. PCT/US2020/040571, 7 pages.

International Search Report dated Mar. 19, 2021 in connection with International Patent Application No. PCT/US2020/036675, 3 pages.

Written Opinion of the International Searching Authority dated Mar. 19, 2021 in connection with International Patent Application No. PCT/US2020/036675, 8 pages.

International Search Report and Written Opinion of the International Searching Authority in connection with International Patent Application No. PCT/US2020/029619 dated Jul. 10, 2020, 8 pages.

International Search Report and Written Opinion of the International Searching Authority in connection with International Patent Application No. PCT/US2020/033176 dated Jul. 15, 2020, 10 pages.

Office Action dated Aug. 6, 2021 in connection with U.S. Appl. No. 16/596,595, 32 pages.

Office Action dated Jul. 1, 2021 in connection with U.S. Appl. No. 16/674,995, 14 pages.

Skaloud et al., "Rigorous approach to bore-sight self-calibration in airborne laser scanning", International Society for Photogrammetry and Remote Sensing, Inc., Sep. 2006, 13 pages.

Office Action dated Nov. 30, 2021 in connection with U.S. Appl. No. 16/674,995, 16 pages.

Office Action dated Dec. 7, 2021 in connection with U.S. Appl. No. 16/596,595, 37 pages.

Advisory Action dated Feb. 11, 2022 in connection with United States Patent Application No. 16/674,995, 6 pp.

Non-Final Office Action dated Jun. 17, 2022 in connection with U.S. Appl. No. 16/559,136, 8 pages.

Notice of Allowance dated Jul. 20, 2022 in connection with U.S. Appl. No. 16/674,995, 9 pages.

Notice of Allowance dated Aug. 8, 2022 in connection with U.S. Appl. No. 16/596,595, 3 pages.

Non-Final Office Action dated Dec. 12, 2023 in connection with U.S. Appl. No. 18/157,645, 10 pages.

\* cited by examiner

SUPER-RESOLUTION AUTOMATIC TARGET AIMPOINT RECOGNITION AND TRACKING

CROSS-REFERENCE TO RELATED APPLICATION AND PRIORITY CLAIM

This application claims priority as a continuation-in-part of U.S. patent application Ser. No. 16/674,995 filed on Nov. 5, 2019, which is hereby incorporated by reference in its entirety.

GOVERNMENT RIGHTS

This invention was made with U.S. government support under contract number W9113M-17-D-0006-0002 awarded by the Department of Defense. The U.S. government may have certain rights in this invention.

TECHNICAL FIELD

This disclosure is generally directed to targeting and aiming systems. More specifically, this disclosure is directed to super-resolution automatic target aimpoint recognition and tracking.

BACKGROUND

High-energy laser (HEL) systems are being developed for a number of commercial and defense-related applications. For example, high-energy lasers may be used to direct HEL beams at incoming missiles, rockets, mortars, or other targets. Unfortunately, it is extremely difficult to keep an HEL beam aimed at the same location on a target as the target moves, which reduces the focused power of the HEL beam on the target. This can increase the amount of time needed to achieve a desired result, such as damage or destruction of the target, or can prevent the desired result from being achieved.

SUMMARY

This disclosure relates to super-resolution automatic target aimpoint recognition and tracking.

In a first embodiment, a system includes at least one imaging sensor configured to capture images of a target. The system also includes at least one controller configured to generate super-resolution images of the target using the captured images and to identify multiple edges of the target using the super-resolution images. The at least one controller is also configured to identify an aimpoint on the target based on the identified edges of the target. In addition, the at least one controller is configured to update the aimpoint on the target as the target moves over time.

In a second embodiment, at least one non-transitory computer readable medium contains instructions that when executed cause at least one processor to obtain captured images of a target and generate super-resolution images of the target using the captured images. The at least one medium also contains instructions that when executed cause the at least one processor to identify multiple edges of the target using the super-resolution images. The at least one medium further contains instructions that when executed cause the at least one processor to identify an aimpoint on the target based on the identified edges of the target. In addition, the at least one medium contains instructions that when executed cause the at least one processor to update the aimpoint on the target as the target moves over time.

In a third embodiment, a method includes obtaining captured images of a target and generating super-resolution images of the target using the captured images. The method also includes identifying multiple edges of the target using the super-resolution images. The method further includes identifying an aimpoint on the target based on the identified edges of the target. In addition, the method includes updating the aimpoint on the target as the target moves over time.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
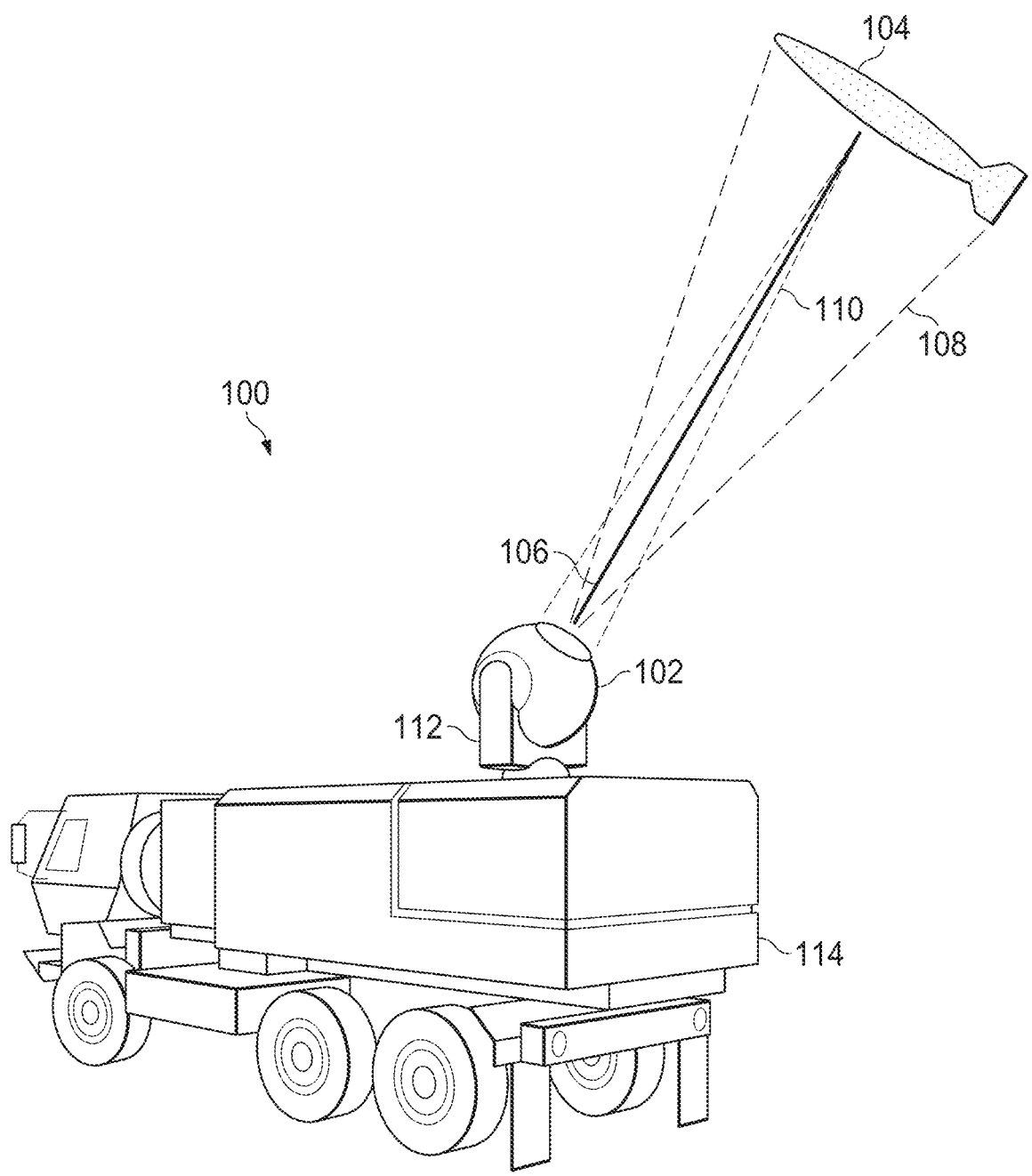
FIG. 1 illustrates an example system supporting super-resolution automatic target aimpoint recognition and tracking according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that any features illustrated in the figures may be employed in any of the embodiments described. Omission of a feature or component from a particular figure is for purposes of simplicity and clarity and is not meant to imply that the feature or component cannot be employed in the embodiments described in connection with that figure.

As noted above, high-energy laser (HEL) systems are being developed for a number of commercial and defense-related applications, such as to direct HEL beams at incoming missiles, rockets, mortars, or other targets. Often times, an aimpoint for an HEL beam on a target is determined using an infrared (IR) camera or other imaging sensor that is boresighted to the HEL beam. The imaging sensor can be used to capture images of the target based on electromagnetic radiation generated by the target itself (passively-illuminated imaging) or electromagnetic radiation generated by a targeting system or other system and reflected off the target (actively-illuminated imaging). In either case, the ability to properly image a target can be critical for keeping a system pointed at the same location on the target.

For systems such as HEL systems, the inability to keep an HEL beam positioned at the same location on a target can increase the amount of time needed to achieve a desired result, such as damage or destruction of the target, or can prevent the desired result from being achieved. Unfortunately, it is common for the aspect and pose of a target to vary in captured images, and the size of the target in the captured images can vary and is typically range-dependent. Moreover, images of different types of targets may need to be captured and analyzed by a system over time. Overall, these and other factors make identifying an aimpoint on a specific target for an HEL system or other system difficult and highly variable.

In some cases, the identification of a target and the identification of an aimpoint on the target are time-critical. For example, when an HEL system is used to destroy incoming rockets, missiles, or mortars, the identification of a target and the identification of an aimpoint on the target may need to occur extremely quickly so that an HEL beam can be directed towards the aimpoint and neutralize the target. In these types of circumstances, the HEL system may only have several seconds to identify a target, identify an aimpoint on the target, generate an HEL beam, and direct the HEL beam onto the target in order to neutralize the target. To provide suitably-fast operations, computer-based vision processing techniques are often used. For instance, high-speed camera images of a target can be captured and used by a tracking system to identify the target and select an aimpoint on the target. However, the identification of an aimpoint on a target often suffers from various issues.

In some approaches, "leading edge tracking" is used, and an aimpoint is identified at a predefined distance from a nose tip of a target. These types of systems operate by finding the leading edge of a target, often by assuming that the target is broadside with a boresighted targeting camera. However, these types of systems cannot adapt to varying target sizes or target shapes, and they are limited to identifying the aimpoint based on the predefined distance. Other approaches may project an image of a target into three-dimensional (3D) coordinates and match the target's shape characteristics with a specific template or model in an online target library, and the aimpoint is then determined based on a selected template or model. However, these approaches require knowledge of the target type, the availability of a library of known target types, and the calculation of range and orientation estimates (which are often based on tracking and ranging sensor information).

This disclosure provides various techniques for automatically determining an aimpoint on a target and providing a stable aimpoint track for HEL beam pointing or other system aiming or targeting functions. As described in more detail below, super-resolution images of a target are generated and used for aimpoint recognition. The super-resolution images are generated using multiple high-speed input images of the target, where the target has been illuminated by target illumination laser (TIL) energy. Since the precision and aimpoint stability needed for certain applications (such as HEL systems) may require the ability to identify errors that are smaller than the finest resolution of imaging sensors, the use of super-resolution imaging can help to overcome these issues. Various processing algorithms are then applied to the super-resolution images to identify edges of the target, identify an aimpoint based on the detected edges, and track the identified aimpoint over time.

In this way, the techniques described in this patent document can be used to identify an aimpoint on a target for an HEL system or other system rapidly and to accurately track the aimpoint on the target over time. In some embodiments, for example, the techniques described below may be used to identify an aimpoint on a target within about 40 milliseconds (ms) of the first image capture. Also, these techniques do not require the use of a target template library or 3D models of targets to identify an aimpoint, although templates or 3D models of targets may be used in some instances. In fact, these techniques can operate successfully using minimal (or no) information about the target type. Further, these techniques support the analysis of the entire target shape (rather than its leading edge only), and these techniques can automatically adapt to changes in the target's shape in captured imagery. Moreover, through the use of super-resolution, these techniques can be used to accurately correct the line-of-sight (LOS) for an HEL system or other system to within a fraction of the system's instantaneous field of view (IFOV), such as to within about one microradian ($\mu$rad) of the field of view. In addition, aimpoint estimation can be smoothly blended with high-speed target tracking to enable both functions to occur seamlessly in an HEL system or other system. Additional details regarding this functionality are provided below.

FIG. 1 illustrates an example system 100 supporting super-resolution automatic target aimpoint recognition and tracking according to this disclosure. As shown in FIG. 1, the system 100 includes a high-energy laser system 102 that is being used to engage a target 104. The target 104 in this example represents a rocket or missile. However, the high-energy laser system 102 may be used with any other suitable targets, such as one or more targets on the ground, in the air, or in space. Also, the functionality for super-resolution automatic target aimpoint recognition and tracking described below may be used with any other suitable system for aiming or targeting purposes.

The laser system 102 in this example generates an HEL beam 106, a target illumination laser (TIL) beam 108, and optionally a beacon illumination laser (BIL) beam 110. The HEL beam 106 represents a beam of laser energy that typically has a high power or energy level, such as at least about 10 kilo-Watts (kW) of power. Often times, the HEL beam 106 is ideally focused to as small an area as possible on the target 104, which is done in order to achieve the maximum possible effect on the target 104. However, because of this, the HEL beam 106 is particularly susceptible to non-consistent placement of the HEL beam 106 on the target 104.

The TIL beam 108 represents a beam of laser energy that spreads out to illuminate most or all of the target 104. By spreading the TIL beam 108 and making it wider than the target 104 (or at least wider than a relevant portion of the target 104), there may be less or no concern about movement of the TIL beam 108 on the target 104. The TIL beam 108 typically has a much lower power or energy level compared to the HEL beam 106. Reflections of the TIL beam 108 off the target 104 can be received at the laser system 102 and used to capture images of the target 104. The images are processed to perform super-resolution automatic target aimpoint recognition and tracking as described below. The images can also be processed to measure, for instance, the distance and angle of the target 104 relative to the laser system 102 or relative to a high-energy laser in the laser system 102. In some embodiments, the TIL beam 108 may represent a continuous wave 1567 nanometer (nm) laser beam, although other suitable longer or shorter wavelengths may be used for the TIL beam 108.

The BIL beam 110 represents a beam of laser energy that may be used to generate a more focused illumination spot or "see spot" on the target 104. In some cases, a particular intended location on the target 104 to be illuminated by the BIL beam 110 may be selected. For example, it may be predetermined to illuminate a particular feature on the nose of the target 104. The BIL beam 110 can be subject to optical turbulence in the atmosphere or other effects that create boresight error for the BIL beam 110. Thus, the actual location of the see spot on the target 104 may vary from the intended or expected location of the see spot, and the difference between the actual and intended/expected locations of the see spot can be used to determine the boresight error. Movement of the BIL beam 110 on the target 104 may be used as a proxy for movement of the HEL beam 106 on the target 104, so adjustments can be made to the HEL beam 106 and the BIL beam 110 to reduce or minimize the movement of the HEL beam 106 and the BIL beam 110 on the target 104. In some embodiments, the BIL beam 110 may represent a 1005 nm laser beam, although other suitable longer or shorter wavelengths may be used for the BIL beam 110. The wavelength of the BIL beam 110 can be close to the wavelength of the HEL beam 106.

The BIL beam 110 can be offset (such as in angle) relative to the HEL beam 106 so that the BIL beam 110 and the HEL beam 106 strike the target 104 at different locations. However, both beams 106 and 110 travel from the laser system 102 to the target 104 in very close proximity to one another, and the actual distance between the strike points for the two beams 106 and 110 can be very small. Because of this, compensating for the boresight error associated with the BIL beam 110 will (ideally) also correct for the same boresight error associated with the HEL beam 106. If the wavelength of the BIL beam 110 is close to the wavelength of the HEL beam 106, the two beams 106 and 110 can experience approximately the same boresight error.

In this particular example, the laser system 102 includes or is used with a multi-axis gimbal 112, which mounts the laser system 102 on a vehicle 114. The multi-axis gimbal 112 includes any suitable structure configured to point the laser system 102 in a desired direction. In some embodiments, the multi-axis gimbal 112 can rotate the laser system 102 about a vertical axis for azimuth control and about a horizontal axis for elevation control. However, any other suitable mechanisms for pointing the laser system 102 (such as about a single axis or multiple axes) may be used here. Also, in this particular example, the vehicle 114 on which the laser system 102 is mounted represents an armored land vehicle. However, the laser system 102 may be used with any other suitable type of vehicle (such as any other suitable land, air, or space vehicle), or the laser system 102 may be mounted to a fixed structure (such as a building).

As described in more detail below, the laser system 102 uses super-resolution imaging to generate high-resolution images of the target 104 based on reflected TIL energy from the TIL beam 108. The high-resolution images have super-resolution since their resolution is greater than the resolution of one or more imaging sensors in the laser system 102. The high-resolution images of the target 104 are processed to automatically identify an aimpoint on the target 104 for the HEL beam 106 and to track the aimpoint on the target 104 over time. This helps to maintain the HEL beam 106 at substantially the same location on the target 104. As a result, the laser system 102 can engage in more effective or accurate aimpoint recognition, aimpoint tracking, and beam pointing for the HEL beam 106.

Although FIG. 1 illustrates one example of a system 100 supporting super-resolution automatic target aimpoint recognition and tracking, various changes may be made to FIG. 1. For example, the laser system 102 may be used in any other suitable environment and for any other suitable purpose. Also, while shown here as being used to damage or destroy a moving hostile target 104, the laser system 102 can be used in any number of other ways depending on the application. Further, as noted above, super-resolution automatic target aimpoint recognition and tracking may be used in other systems that may or may not involve the use of a high-energy laser system 102 or an HEL beam 106.

As noted above, there are various commercial and other non-defense-related applications for high-energy laser systems that may benefit from the approaches described in this patent document. For instance, in commercial mining applications like drilling, mining, or coring operations, a high-energy laser can be used to soften or weaken an earth bed prior to drilling, which may allow for fewer drill bit changes and extended lifetimes and reliabilities of drill bits. In remote laser welding, cutting, drilling, or heat treating operations like industrial or other automation settings, a high-energy laser can be used to allow for the processing of thicker materials at larger working distances from the laser system while minimizing the heat-affected zone and maintaining vertical or other cut lines. This helps to support welding or cutting operations where proximity to the weld or cut site is difficult or hazardous and helps to protect the laser system and possibly any human operators from smoke, debris, or other harmful materials. In construction and demolition operations like metal resurfacing or deslagging, paint removal, and industrial demolition operations, a high-energy laser can be used to ablate material much faster and safer compared to conventional operations. As a particular example of this functionality, a high-energy laser can be used to support demolition of nuclear reactors or other hazardous structures, such as by cutting through contaminated structures like contaminated concrete or nuclear containment vessels or reactors from long distances. This avoids the use of water jet cutting or other techniques (which creates contaminated water or other hazardous waste) and provides improved safety (since human operators can remain farther away from contaminated structures being demolished). A number of additional applications are possible, such as with a high-energy laser in power beaming applications (where a beam is targeted to photovoltaic cells of remote devices to be recharged) or hazardous material applications (where a beam is used to heat and decompose hazardous materials into less harmful or non-harmful materials).

Figure 2:
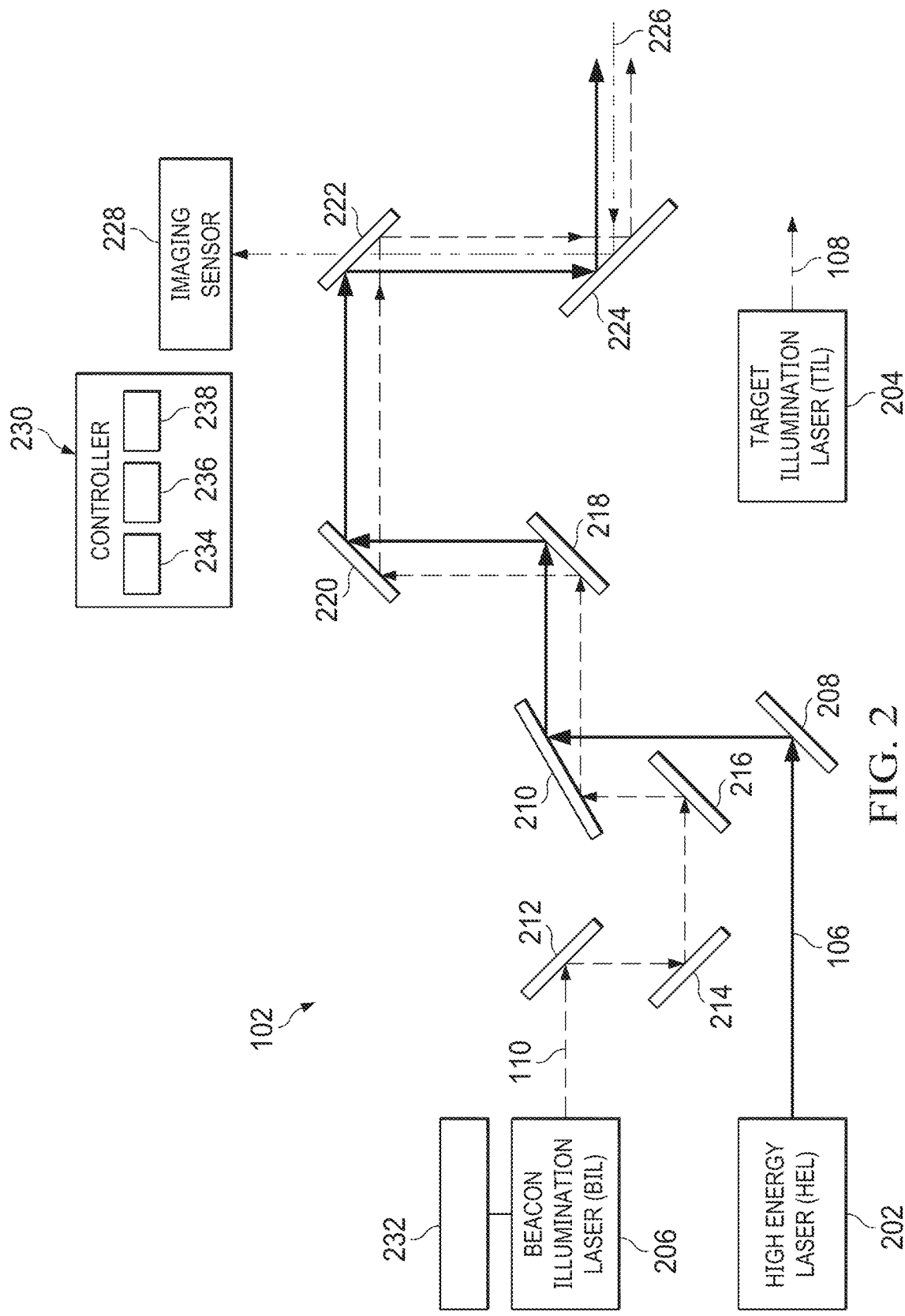
FIG. 2 illustrates an example high-energy laser system supporting super-resolution automatic target aimpoint recognition and tracking according to this disclosure.

FIG. 2 illustrates an example high-energy laser system 102 supporting super-resolution automatic target aimpoint recognition and tracking according to this disclosure. For ease of explanation, the high-energy laser system 102 shown in FIG. 2 may be described as being used in the system 100 of FIG. 1 to engage a hostile target 104. However, the high-energy laser system 102 of FIG. 2 may be used in any other suitable environment and for any other suitable purpose.

As shown in FIG. 2, the high-energy laser system 102 includes a high-energy laser 202, a target illumination laser 204, and optionally a beacon illumination laser 206. As described above, the high-energy laser 202 is used to generate the HEL beam 106, the target illumination laser 204 is used to generate the TIL beam 108, and the beacon illumination laser 206 may be used to generate the BIL beam 110. Each laser 202, 204, and 206 represents any suitable structure configured to generate the appropriate laser energy. In some embodiments, the high-energy laser 202 includes a planar waveguide (PWG) amplifier or other optical amplifier, which amplifies a seed laser beam using pump power provided to the optical amplifier by one or more pump sources (such as one or more laser diode arrays) to produce the HEL beam 106. However, any other suitable laser may be used here as the high-energy laser 202. Also, the target illumination laser 204 may represent a continuous wave 1567 nm laser, and the beacon illumination laser 206 may represent a 1005 nm laser. However, any other suitable lasers may be used here as the target illumination laser 204 and the beacon illumination laser 206.

In this example, the HEL beam 106 is transmitted towards a fold mirror 208, which redirects the HEL beam 106 towards a deformable mirror 210. The fold mirror 208 includes any suitable reflective structure configured to reflect one or more laser beams in a desired direction. The deformable mirror 210 includes at least one deformable reflective surface that can be used to alter a wavefront of the HEL beam 106 and optionally a wavefront of the BIL beam 110. This allows for pre-distortion of the wavefront of at least the HEL beam 106 prior to transmission towards the target 104, which helps to compensate for atmospheric wavefront errors. The actual pre-distortion provided by the deformable mirror 210 can be controlled based on wavefront errors sensed by an optional wavefront sensor, which is not shown in FIG. 2 for convenience. The deformable mirror 210 includes any suitable deformable reflective structure configured to reflect one or more laser beams in a desired direction. In some embodiments, the deformable mirror 210 may represent a digital micro-mirror device (DMD), which may include numerous very small mirrors that can be repositioned or reoriented to provide the desired wavefront correction.

Two fast steering mirrors 212 and 214 and an additional fold mirror 216 may be used to provide the BIL beam 110 from the beacon illumination laser 206 to the deformable mirror 210. Each of the fast steering mirrors 212 and 214 may be configured to be repositioned, reoriented, or reshaped in order to generally align the BIL beam 110 with the HEL beam 106 as desired. The BIL beam 110 here can be dynamically offset but otherwise aligned with the HEL beam 106 using the fast steering mirrors 212 and 214. This enables the BIL beam 110 to be offset (such as in angle) relative to the HEL beam 106 but to still travel in substantially the same direction towards the target 104. The fold mirror 216 may redirect the BIL beam 110 towards the deformable mirror 210. Each fast steering mirror 212 and 214 includes any suitable reflective structure configured to reflect one or more laser beams in a controllable direction, and each fast steering mirror 212 and 214 typically includes at least one servo for controlling how the one or more laser beams are directed. The fold mirror 216 includes any suitable reflective structure configured to reflect one or more laser beams in a desired direction.

Two additional fast steering mirrors 218 and 220 are used to redirect the HEL beam 106 and optionally the BIL beam 110 through the optical assembly. Since these fast steering mirrors 218 and 220 are being used to transport one or more beams 106 and 110 generally along the polar axis of the laser system 102, the fast steering mirrors 218 and 220 may be referred to as Coudé Path fast steering mirrors. Each fast steering mirror 218 and 220 includes any suitable reflective structure configured to reflect one or more laser beams in a controllable direction, and each fast steering mirror 218 and 220 typically includes at least one servo for controlling how the laser beams are directed.

An aperture sharing element 222 reflects the HEL beam 106 and optionally the BIL beam 110 towards a high-speed mirror 224, which can be reoriented to provide tip and tilt compensation for the one or more beams 106 and 110. For example, the high-speed mirror 224 can be controlled using a fine tracking control loop that allows very small changes to be made very quickly to the orientation of the high-speed mirror 224. This can help to keep the one or more beams 106 and 110 at one or more desired positions on the target 104 and reduce boresight error. The high-speed mirror 224 includes any suitable reflective structure configured to reflect one or more laser beams in a controllable direction, and the high-speed mirror 224 typically includes at least one servo for controlling how the laser beams are directed.

The high-speed mirror 224 also receives reflected laser energy 226 from the target 104 and redirects the reflected laser energy 226 towards the aperture sharing element 222, which passes the reflected laser energy 226 to an imaging sensor 228. The aperture sharing element 222 here can reflect or otherwise redirect the one or more outgoing beams 106 and 110 towards the high-speed mirror 224 and transmit or otherwise allow passage of the reflected laser energy 226 from the high-speed mirror 224. This supports simultaneous transmission of the one or more beams 106 and 110 towards the target 104 and reception of the reflected laser energy 226 from the target 104. The aperture sharing element 222 includes any suitable structure configured to redirect some laser energy and to allow passage of other laser energy, such as a dichroic mirror. Note that the reflected laser energy 226 here may not be redirected by the fast steering mirrors 212, 214, 218, and 220, which means the fast steering mirrors can be used to control the HEL beam 106 and the BIL beam 110 separate from any control used to provide the reflected laser energy 226 to the imaging sensor 228.

The imaging sensor 228 is co-boresighted with the HEL beam 106, and the imaging sensor 228 is configured to capture images of the target 104 and the reflected laser energy 226. The reflected laser energy 226 here can include reflected TIL energy and possibly reflected BIL energy. The reflected laser energy 226 can also include any other illumination reflected from the target 104 towards the laser system 102, such as a reflected portion of the HEL beam 106. The imaging sensor 228 represents a camera or other suitable imager configured to capture images of a scene. In some embodiments, the imaging sensor 228 represents a high-speed short-wave infrared (SWIR) camera. The images captured by the imaging sensor 228 can be processed as discussed below to (among other things) support super-resolution automatic target aimpoint recognition and tracking.

The images captured by the imaging sensor 228 are provided to a controller 230, which controls the overall operation of the laser system 102 and possibly a larger system into which the laser system 102 is integrated. For example, the controller 230 can control the operation of the lasers 202, 204, and 206 and the operation of the imaging sensor 228. The controller 230 can process various images from the imaging sensor 228 to perform super-resolution automatic target aimpoint recognition and tracking. The controller 230 can also process various images from the imaging sensor 228 to perform other functions, such as beam pointing and boresight error correction. As particular examples, the controller 230 may process the images from the imaging sensor 228 to identify locations of the HEL beam 106 and the BIL beam 110 on the target 104 and adjust one or more of the fast steering mirrors 212, 214, 218, 220 or the high-speed mirror 224 to change how one or both of the HEL beam 106 and the BIL beam 110 are directed towards the target 104. This allows the controller 230 to maintain separation of the HEL beam 106 and the BIL beam 110 actually on the target 104. The controller 230 may further process the images from the imaging sensor 228 to identify boresight error and control the high-speed mirror 224 to help compensate for the boresight error. In addition, the controller 230 may interact with an acoustic-optical modulator 232 or other mechanism used to modulate or pulse the operation of the beacon illumination laser 206 so that, at times, images containing reflected TIL energy without reflected BIL energy can be obtained by the imaging sensor 228 and processed by the controller 230. Of course, other mechanisms for modulating the BIL beam 110 (such as physically blocking or redirecting the BIL beam 110 away from the target 104) may be used, or the modulator 232 and the beacon illumination laser 206 can be omitted if not needed.

The controller 230 includes any suitable structure configured to process images and control one or more operations of a laser system or other system. For example, the controller 230 may include any suitable hardware or combination of hardware and software/firmware instructions for processing images and controlling one or more operations of a laser system or other system, and the controller 230 may be programmable or dedicated.

In some embodiments, the controller 230 includes at least one processor 234, at least one memory 236, and at least one communication interface 238. The at least one processor 234 may be configured to execute instructions stored in and obtained from at least one memory 236. The at least one processor 234 may include any suitable number(s) and type(s) of processing devices or other computing or control devices in any suitable arrangement. As specific examples, the at least one processor 234 may include one or more microprocessors, microcontrollers, digital signal processors (DSPs), field programmable gate arrays (FPGAs), application specific integrated circuits (ASICS), or discrete circuitry. The at least one memory 236 may include any suitable number(s) and type(s) of data storage and retrieval devices, such as random access memory, read only memory, Flash memory, a hard drive, an optical drive, or other memory. The at least one communication interface 238 may include any suitable number(s) and type(s) of interfaces allowing communication with other components of the laser system 102 or a larger system, such as one or more wired or wireless interfaces. Note that while shown and described as having a single controller 230, the laser system 102 may include multiple controllers that are used to control different aspects of the laser system 102.

Note that in this example, the TIL beam 108 is directed towards the target 104 separate from the HEL beam 106 and the BIL beam 110, and the TIL beam 108 does not pass through the aperture sharing element 222 and is not reflected by the high-speed mirror 224. In fact, in this example, the TIL beam 108 does not share any part of its optical path with the HEL beam 106 and the BIL beam 110 inside the laser system 102. However, that need not be the case, and the TIL beam 108 may follow a common optical path through part of the laser system 102 as the HEL beam 106 and the BIL beam 110. Also, while not shown here for convenience, one or more mirrors (such as one or more fast steering mirrors) and other optical devices may be used to direct the TIL beam 108 towards the target 104.

Figure 3:
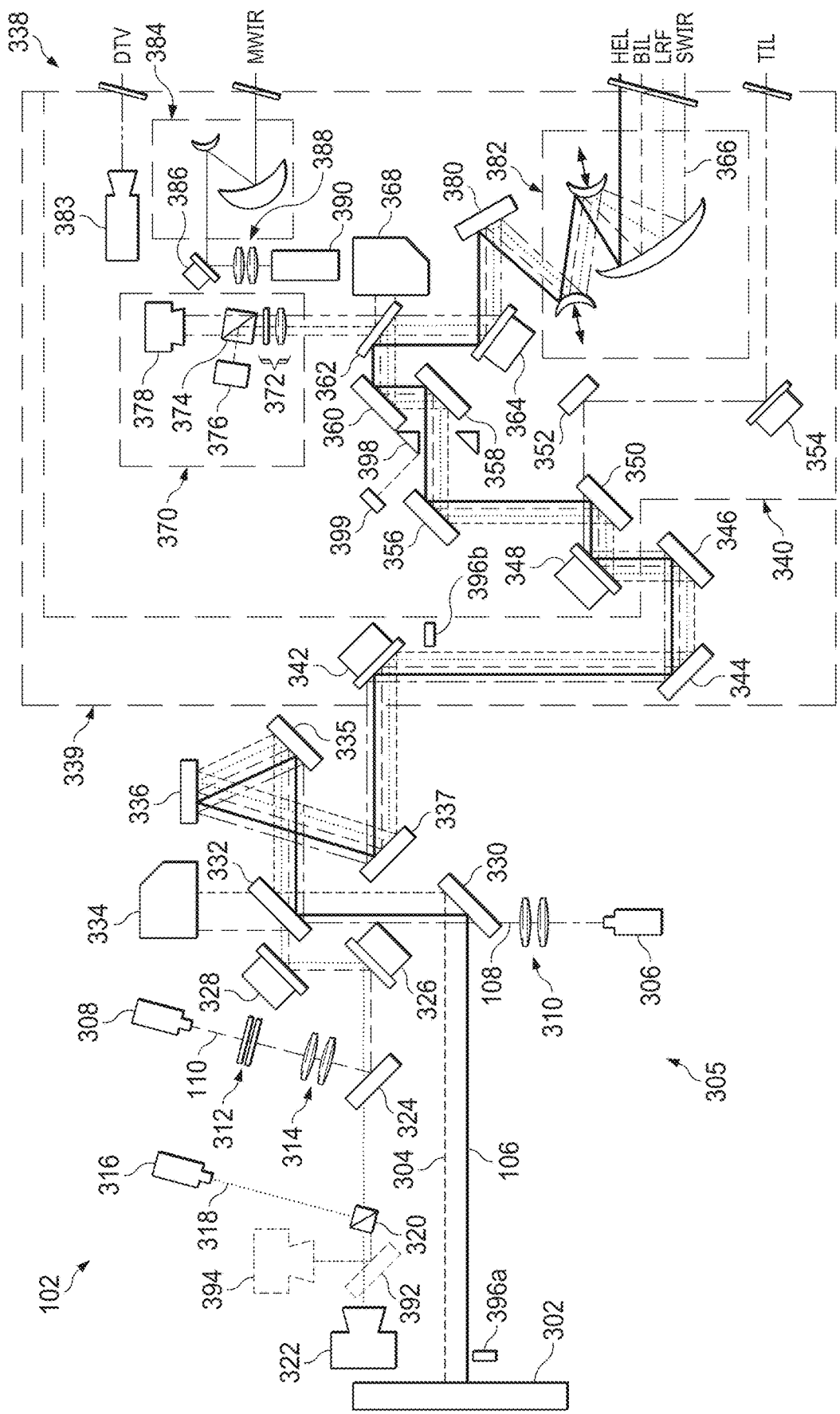
FIG. 3 illustrates another example high-energy laser system supporting super-resolution automatic target aimpoint recognition and tracking according to this disclosure.

FIG. 3 illustrates another example high-energy laser system 102 supporting super-resolution automatic target aim-point recognition and tracking according to this disclosure. In particular, FIG. 3 illustrates a more detailed example implementation of the laser system 102 compared to FIG. 2. However, the laser system 102 shown in FIG. 3 operates in the same or similar manner as the laser system 102 shown in FIG. 2. For ease of explanation, the high-energy laser system 102 shown in FIG. 3 may be described as being used in the system 100 of FIG. 1 to engage a hostile target 104. However, the high-energy laser system 102 of FIG. 3 may be used in any other suitable environment and for any other suitable purpose.

As shown in FIG. 3, the laser system 102 includes a high-energy laser generator 302, which generates the HEL beam 106 and an auto-alignment (AA) beam 304. In some embodiments, the high-energy laser generator 302 includes one or more lasers that generate beams at different wavelengths and a spectral beam combining unit that combines the beams to produce a single overlapping beam, which here includes the HEL beam 106 and the AA beam 304. The AA beam 304 can be used internally within the laser system 102 for alignment purposes.

The laser system 102 also includes a laser alignment module (LAM) 305, which generally operates to produce one or more additional laser beams and to align the additional beam(s) with the HEL beam 106. In this example, a target illumination laser 306 (such as a 1567 nm laser) produces the TIL beam 108, and a beacon illumination laser 308 (such as a 1005 nm laser) may optionally produce the BIL beam 110. Variable divergence optics 310 can be used to alter the divergence of the TIL beam 108 in order to obtain a variable beam footprint for the TIL beam 108, which can help to ensure that the TIL beam 108 spreads over the entire target 104 or a desired portion of the target 104. A polarizer 312 can be used to set or alter the polarization of the BIL beam 110, and one or more beam expanders 314 can be used to increase the cross-sectional size of the BIL beam 110.

An additional laser 316 (such as a 1535 nm laser) is provided in the laser system 102 for laser range-finding. The range-finding laser 316 generates a range-finding beam 318, which is provided to a beam splitter 320. The beam splitter 320 divides the range-finding beam 318 into a first portion that is directed towards the target 104 and a second portion that is directed towards a range-finding receiver 322. The range-finding receiver 322 also senses part of the range-finding beam 318 that reflects off the target 104. Time-of-flight calculations, such as based on a time difference between reception of the second portion of the range-finding beam 318 from the beam splitter 320 and reception of the reflection at the receiver 322, or other calculations can be performed to estimate the distance to the target 104. Note, however, that the use of a laser range-finder is not required in the laser system 102.

A first dichroic mirror or other beam splitter/combiner 324 reflects the BIL beam 110 and transmits the first portion of the range-finding beam 318 towards a first fast steering mirror 326. The first fast steering mirror 326 and a second fast steering mirror 328 redirect the BIL beam 110 and the first portion of the range-finding beam 318. This can be done to help ensure that the BIL beam 110 is offset from the HEL beam 106 at the target 104. A second dichroic mirror or other beam splitter/combiner 330 reflects the HEL beam 106 and the AA beam 304 and transmits the TIL beam 108. A third dichroic mirror or other beam splitter/combiner 332 reflects the HEL beam 106, the AA beam 304, and the TIL beam 108 and transmits the BIL beam 110 and the range-finding beam 318. At this point, the various beams 106, 108, 110, 304, and 318 are generally aligned and follow a common optical path through part of the laser system 102. The third dichroic mirror or other beam splitter/combiner 332 also reflects a small portion of the BIL beam 110 and transmits a small portion of the AA beam 304 to a BIL/AA alignment sensor 334, which can sense the locations of the BIL beam 110 and the AA beam 304. This information can be used (such as by the controller 230, which is not shown in FIG. 3) to adjust one or both fast steering mirrors 326 and 328 in order to obtain a desired alignment and offset of the BIL beam 110 relative to the AA beam 304 (and therefore relative to the HEL beam 106).

Additional mirrors 335, 336, and 337 redirect the aligned beams 106, 108, 110, 304, and 318 as needed. In some embodiments, the mirrors 335, 336, and 337 may represent fold mirrors. In other embodiments, the mirrors 336 and 337 may represent fold mirrors, and the mirror 335 may represent an adaptive optic, such as a deformable mirror, used to correct for higher-order wavefront errors in at least the HEL beam 106 (and possibly in one or more of the other beams 108, 110, 304, and 318).

The laser system 102 further includes a beam director 338, which generally operates to direct the various beams 106, 108, 110, 304, and 318 towards the target 104. In this example, the beam director 338 includes an azimuth gimbal 339 and an elevation gimbal 340. The azimuth gimbal 339 may rotate various components (including the elevation gimbal 340) about a vertical axis for azimuth control, and the elevation gimbal 340 may rotate various components about a horizontal axis for elevation control.

The azimuth gimbal 339 in this example includes a fast steering mirror 342 and two fold mirrors 344 and 346, and the elevation gimbal 340 in this example includes a fast steering mirror 348. The fast steering mirrors 342 and 348 may represent Coudé Path fast steering mirrors, and the fold mirrors 344 and 346 may represent Coudé Path fold mirrors (since they are being used to transport the beams generally along the polar axis of the laser system 102). A first dichroic mirror or other beam splitter/combiner 350 is used to separate the TIL beam 108 from the other beams 106, 110, 304, and 318. The TIL beam 108 is redirected by a mirror 352 to a fast steering mirror 354, which can be adjusted (such as by the controller 230) in order to control how the TIL beam 108 is directed towards the target 104.

The other beams 106, 110, 304, and 318 are redirected using mirrors 356, 358, and 360 to a second dichroic mirror or other beam splitter/combiner 362. The second beam splitter/combiner 362 reflects the HEL beam 106, the BIL beam 110, and the range-finding beam 318 towards a fast steering mirror 364. The second beam splitter/combiner 362 also transmits incoming energy 366 (such as SWIR energy), where the incoming energy 366 may include reflections of the TIL beam 108 and optionally the BIL beam 110. Further, the second beam splitter/combiner 362 may provide at least part of the AA beam 304 to an LOS/AA alignment sensor 368, which can sense the location of the AA beam 304. This information can be used (such as by the controller 230) to adjust one or more fast steering mirrors 342, 348, 354, and 364 to obtain a desired line-of-sight to the target 104. In addition, the second beam splitter/combiner 362 may provide a portion of the AA beam 304 and optionally a portion of the BIL beam 110 to an imaging subsystem 370, which also receives the incoming energy 366.

The imaging subsystem 370 in this example includes optics 372, such as polarizers, lenses, or other components used to pre-process the portion of the AA beam 304, the portion of the BIL beam 110 (if present), and the incoming energy 366. A beam splitter 374 reflects the portion of the AA beam 304 to a position sensitivity detector 376 (such as a SWIR camera), which can detect the location of the AA beam 304. The beam splitter 374 also transmits the portion of the BIL beam 110 (if present) and the incoming energy 366 to an imaging sensor 378 (such as a Fourier transform spectrometer). Among other things, the imaging sensor 378 can capture images of the target 104, and the images can include reflected TIL energy and possibly reflected BIL energy (depending on the modulation of the beacon illumination laser 308, if present, at the time of image capture). As described above, the images can be processed by the controller 230 to perform various functions, such as super-resolution automatic target aimpoint recognition and tracking.

The beams 106, 108, and 318 as reflected by the fast steering mirror 364 are reflected by a mirror 380 to a telescope 382. The mirror 380 may represent a fold mirror or an adaptive optic, such as a deformable mirror used for focus control. The mirror 380 also reflects the incoming energy 366, which is received by the telescope 382, towards the fast steering mirror 364. The telescope 382 directs the beams 106, 108, and 318 towards the target 104 and receives the incoming energy 366, which can include TIL, optionally BIL, and other optical energy reflected from the target 104. In this example, the telescope 382 represents an afocal telescope having a large primary mirror and two smaller adjustable mirrors, although other types of telescopes may be used.

Various additional components may be used in the laser system 102 shown in FIG. 3. For example, a digital camera 383 may be used to capture visible images of a scene. A telescope 384 (such as an afocal telescope having a large primary mirror and a smaller adjustable mirror), a fast steering mirror 386, optics 388, and an infrared camera 390 (such as a mid-wave infrared or "MWIR" camera) may be used to capture infrared images of a scene. A dichroic mirror or other beam splitter/combiner 392 may be used to pass the second portion of the range-finding beam 318 to the range-finding receiver 322 while reflecting a portion of the BIL beam 110 (which is provided via the dichroic mirror or other beam splitter/combiner 324 and the beam splitter 320) if present to a wavefront sensor 394. One or more humidity sensors 396a-396b may be used to sense moisture within the laser system 102, which may be considered by the controller 230 when performing certain functions (such as determining how to adjust one or more fast steering mirrors). At least one safety scraper 398 can be used to absorb stray laser energy or redirect the stray laser energy to a beam dump or other location(s) for termination. At least one safety sensor 399 can be used to detect if stray laser energy presents a safety concern or other issue, which may allow the controller 230 to shut down the laser system 102, adjust one or more fast steering mirrors, or take other corrective action. Note, however, that one, some, or all of these features may be omitted.

Although FIGS. 2 and 3 illustrate examples of high-energy laser systems 102 supporting super-resolution automatic target aimpoint recognition and tracking, various changes may be made to FIGS. 2 and 3. For example, the makeup and arrangement of the laser systems 102 shown in FIGS. 2 and 3 are for illustration only, and components can be added, omitted, combined, further subdivided, replicated, or placed in any other suitable configuration according to particular needs. As a particular example, the arrangements of mirrors and other optical devices in FIGS. 2 and 3 to route different optical beams may be based on specific implementation needs, and other arrangements of mirrors and other optical devices may be used to direct optical beams in the desired manner. Also, the number(s) and type(s) of mirrors and other optical devices can vary based on the specific needs in a laser system. In general, this disclosure is not limited to any specific arrangement of mirrors and other optical devices. Further, note that any single feature or any combination of features shown in FIG. 3 but not in FIG. 2 may be added to the laser system 102 of FIG. 2 or omitted from the laser system 102 of FIG. 3 as needed or desired. In addition, these laser systems represent examples of systems in which images can be captured and used for super-resolution automatic target aimpoint recognition and tracking. However, the functionality for super-resolution automatic target aimpoint recognition and tracking described in this patent document may be used in any other suitable system, whether or not HEL-based.

Figure 4:
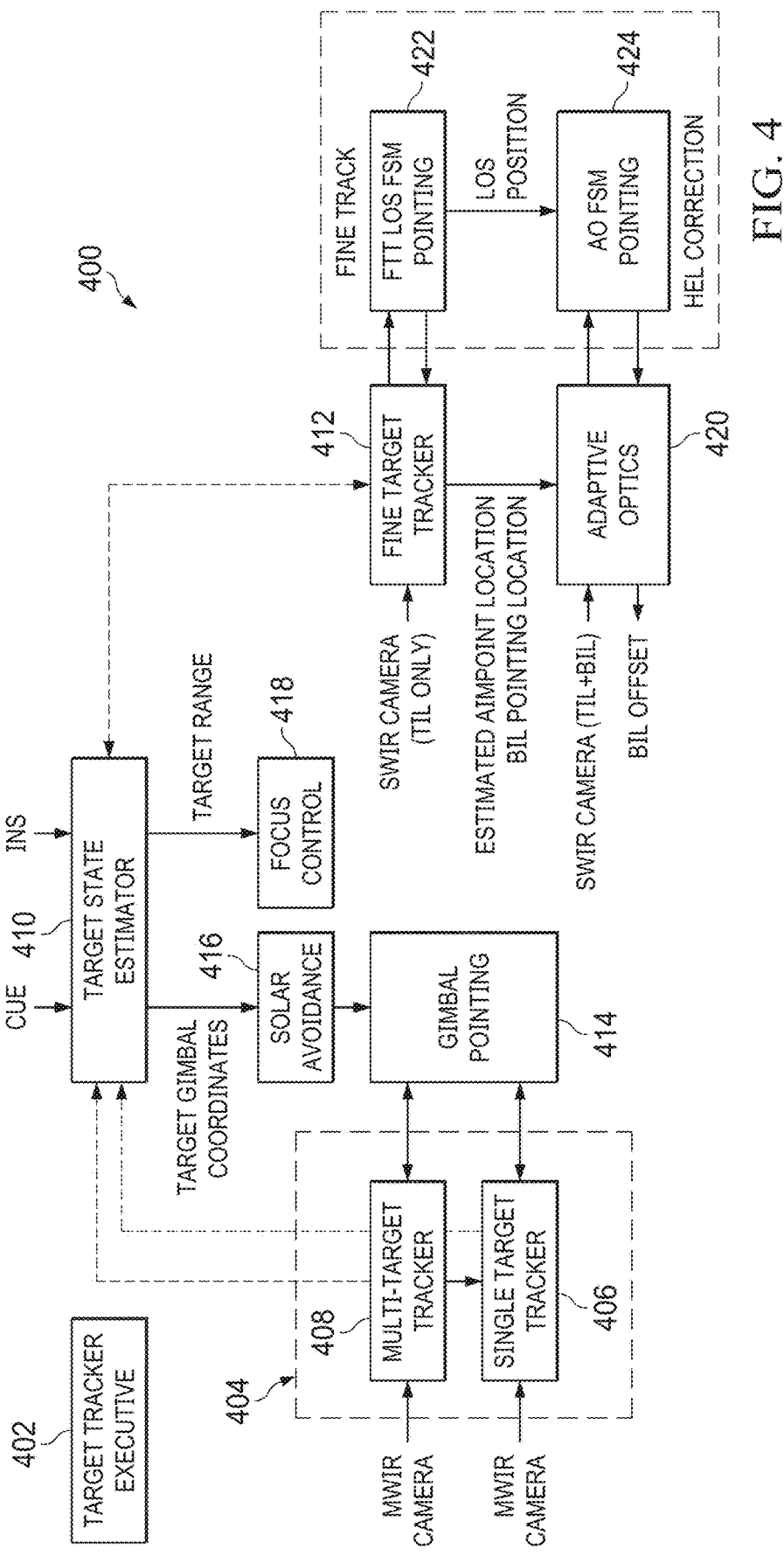
FIGS. 4 through 6 illustrate an example control system supporting super-resolution automatic target aimpoint recognition and tracking according to this disclosure.
Figure 5:
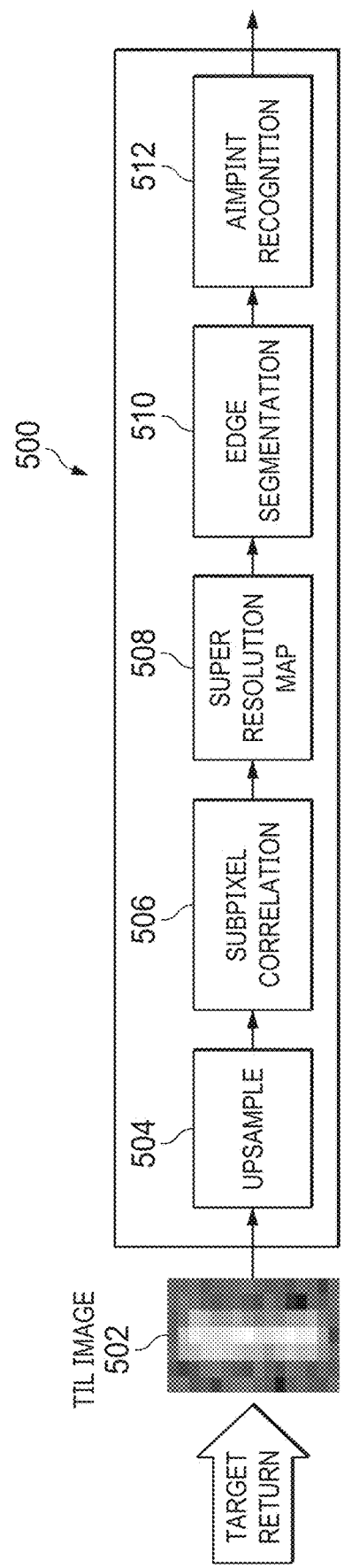
Figure 6:
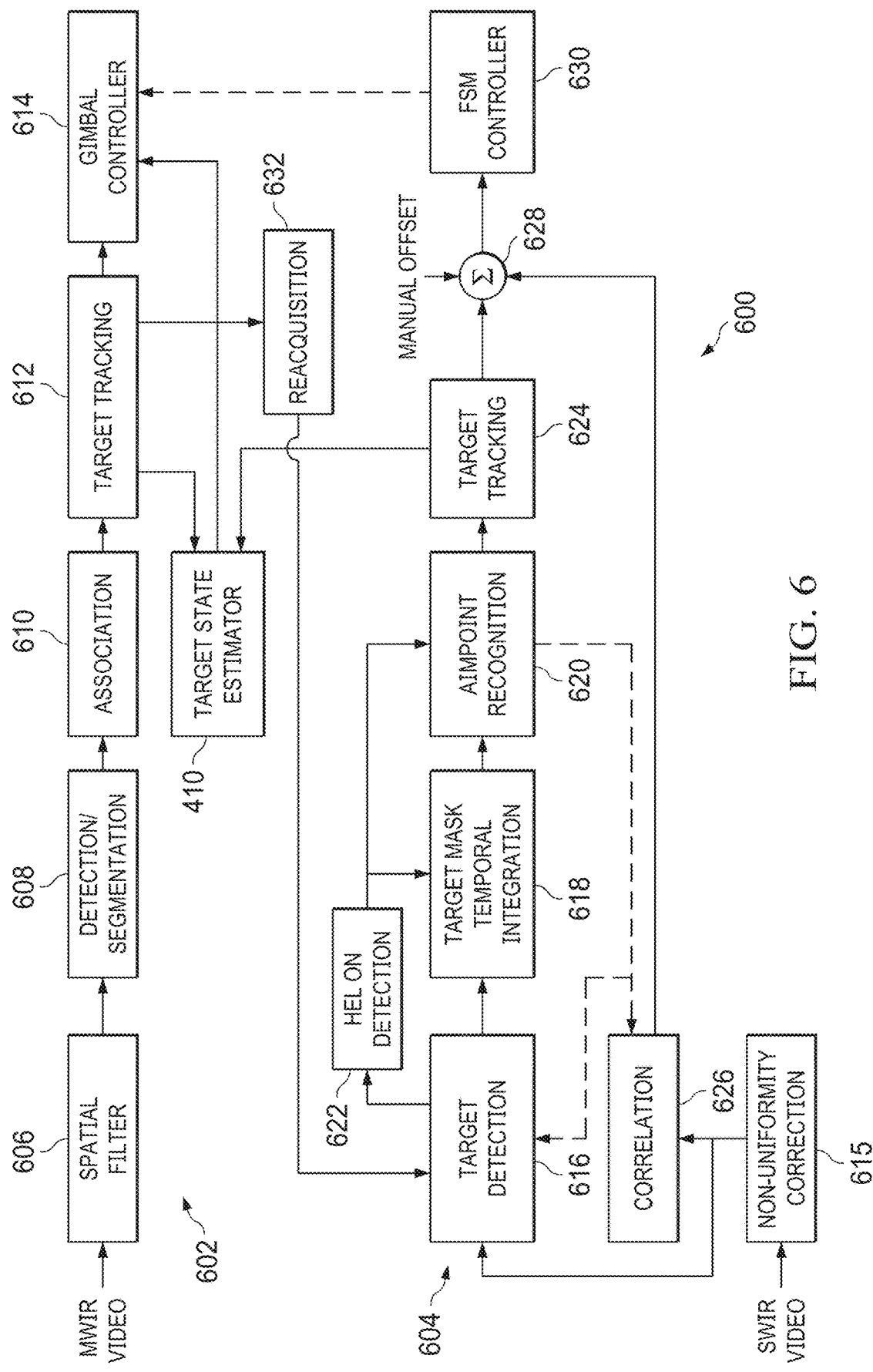

FIGS. 4 through 6 illustrate an example control system 400 supporting super-resolution automatic target aimpoint recognition and tracking according to this disclosure. For ease of explanation, the control system 400 shown in FIGS. 4 through 6 may be described as being used with the high-energy laser system 102 of FIG. 2 or 3 in the system 100 of FIG. 1 to engage a hostile target 104. However, the control system 400 may be used with any other suitable high-energy laser system in any other suitable environment and for any other suitable purpose. Also, the control system 400 (or portions of the control system 400) may be used with any other suitable system for aiming or targeting purposes, regardless of whether that system is HEL-based.

As shown in FIG. 4, the control system 400 includes a target tracker executive function 402, which generally operates to control the other functions of the control system 400. For example, the target tracker executive function 402 can control the tracking states, control modes, timing, and functions that are performed in the control system 400.

An acquisition and tracking controller (ATC) function 404 generally operates to identify and output coarse target tracks for one or more targets 104. In this example, the ATC function 404 includes a single target tracker function 406 and a multi-target tracker function 408. The single target tracker function 406 generally operates to identify small individual targets 104 in a field of view and output target positions, such as in pixel coordinates. In some embodiments, the single target tracker function 406 can identify the centroid of each target 104, correlate the movements of each target 104, and generate target state estimates and tracking errors for gimbal pointing. The single target tracker function 406 can also acquire targets 104 and reject false detections, such as by using kinematics-matching filters. In this example, the single target tracker function 406 receives input from an MWIR camera (such as the infrared camera 390), although other or additional input may be used here.

The multi-target tracker function 408 generally operates to identify multiple targets 104 in a field of view and output target positions, such as in pixel coordinates. In some embodiments, the multi-target tracker function 408 can identify the centroid of each target 104, correlate the movements of each target 104, and generate target state estimates and tracking errors for gimbal pointing. The multi-target tracker function 408 can also acquire targets 104 and reject false detections, such as by using kinematics-matching filters, and facilitate break-lock reacquisition. In this example, the multi-target tracker function 408 receives input from an MWIR camera (such as the infrared camera 390), although other or additional input may be used here.

A target state estimator (TSE) function 410 processes various information to determine current and predicted states of one or more identified targets 104. For example, the TSE function 410 can receive target locations from the ATC function 404 and can exchange additional target locations or other information with a fine target tracker (FTT) function 412. The TSE function 410 can also receive additional inputs, such as cues from other sensors and inputs from an inertial navigation system (INS). The TSE function 410 processes this or other information and generates inertial target state estimates for the identified targets 104, such as by using extended Kalman filter (EKF) tracking. The TSE function 410 can also engage in break-lock reacquisition. One or more filters can be used with the identified target locations to help filter out disturbances in the estimated locations. The TSE function 410 can further convert the determined target state estimates or other information into line-of-sight information, gimbal coordinates, and/or estimated ranges.

A gimbal pointing function 414 controls the direction in which a gimbal (such as the multi-axis gimbal 112 or the gimbals 339-340) is pointing a laser system 102. The gimbal pointing function 414 can use the target state estimates and tracking errors from the ATC function 404 and the gimbal coordinates from the TSE function 410 to determine where to point the laser system 102. In some embodiments, a solar avoidance function 416 can initially process the gimbal coordinates from the TSE function 410 in order to exclude potentially pointing the laser system 102 into or near the sun or other source of bright irradiance. A focus control function 418 controls the focus of the laser system 102 based on the estimated range to at least one target 104.

The FTT function 412 generally operates to provide line-of-sight stabilization for the laser system 102. For example, the FTT function 412 can track one or more centroids of one or more targets 104 (which can be used for HEL pointing), update target state estimates and tracking errors to the TSE function 410, and perform line-of-sight stabilization. The FTT function 412 also provides information identifying desired aimpoints of one or more laser beams (such as the HEL beam 106, TIL beam 108, and BIL beam 110) and a desired pointing location for the BIL beam 110 (assuming the BIL beam 110 is used). Adjustments to the locations of the HEL beam 106 and the BIL beam 110 on a specific target 104 can be controlled based on this information, such as by adjusting one or more of the fast steering mirrors 212, 214, 218, 220, 326, 328, 342, 348, 354, 364. In this example, the FTT function 412 receives input in the form of images containing reflected TIL energy without reflected BIL energy from an SWIR camera (such as the imaging sensor 228 or 378), although other suitable imaging sensors may be used here.

An adaptive optics (AO) function 420 generally operates to provide uplink tip-tilt correction and other boresight error correction. For example, the AO function 420 can identify a see spot location gradient (a difference in actual and expected/desired locations of a see spot generated by the BIL beam 110 on a target 104), identify the position of the HEL beam 106 (such as in in pixel coordinates) on the target 104, correlate the centroid position of the target 104, and generate tip-tilt corrections. The AO function 420 can also identify how the BIL beam 110 should be offset from the HEL beam 106 on a target 104. The corrections and offset can be controlled based on this information, such as by adjusting one or more of the fast steering mirrors 212, 214, 218, 220, 326, 328, 342, 348, 354, 364 and/or the high-speed mirror 224. Ideally, this stabilizes the BIL beam 110 on the target 104 and therefore stabilizes the HEL beam 106 at a desired aimpoint on the target 104. In this example, the AO function 420 receives input in the form of images containing reflected TIL energy and reflected BIL energy from an SWIR camera (such as the imaging sensor 228 or 378), although other suitable imaging sensors may be used here.

An FTT LOS fast steering mirror (FSM) pointing function 422 and an AO FSM pointing function 424 generally operate to adjust the optical devices in the laser system 102 to provide the desired adjustments to the HEL beam 106, the TIL beam 108, and the BIL beam 110. For example, the pointing functions 422 and 424 may cause adjustments to be made to any of the fast steering mirrors 212, 214, 218, 220, 326, 328, 342, 348, 354, 364 and/or the high-speed mirror 224. The pointing function 422 helps to achieve fine tracking changes in the line-of-sight for a target 104 by keeping the laser system 102 directed at the selected aimpoint on the target 104. The pointing function 424 helps to achieve fine HEL corrections in the position of the HEL beam 106 on the target 104.

Each of the functions 402-424 shown in FIG. 4 may be implemented in any suitable manner. For example, one, some, or all of the functions 402-424 may be implemented using dedicated hardware, such as at least one DSP, FPGA, or ASIC. As another example, one, some, or all of the functions 402-424 may be implemented using hardware with software/firmware instructions, such as at least one processor that executes software/firmware instructions. A combination of dedicated hardware and hardware with software/firmware can also be used. In general, the control system 400 is not limited to any specific configuration and can be implemented in any number of ways.

FIG. 5 illustrates an example aimpoint processing algorithm 500 that can be performed as part of the FTT function 412 or other system used for targeting or aiming. The aimpoint processing algorithm 500 here supports the super-resolution automatic target aimpoint recognition and tracking functionality for the laser system 102 or other system being aimed. As shown in FIG. 5, the aimpoint processing algorithm 500 receives input images 502 that contain reflected TIL energy from a target 104. Depending on the implementation, the images 502 may be received at a specific rate, such as between about 400 Hz to about 800 Hz. In some cases, the images 502 may be received at a rate of 750 Hz. However, the images 502 can be received at any other suitable rate. Although not shown here, the images 502 may be pre-processed in any suitable manner, such as by performing initial clutter processing to enable easier target acquisition.

The images 502 are processed using an upsample function 504, which increases the amount of image data contained in the images 502. Any suitable technique can be used here to upsample the image data. Various techniques for upsampling data are known in the art, and other techniques are sure to be developed in the future. In some embodiments, the upsample function 504 performs interpolation using the existing image data contained in the images 502 to produce additional image data at a spatial resolution that is higher than the pixel spacing of the focal plane array in the camera that captures the images 502. The results produced by the upsample function 504 include upsampled images.

The upsampled images are processed using a subpixel correlation function 506, which aligns the upsampled images at the subpixel spacing level. Any suitable technique can be used here to correlate the upsampled image data. Various techniques for correlating image data are known in the art, and other techniques are sure to be developed in the future. In some embodiments, the subpixel correlation function 506 uses a maximum a posteriori probability (MAP)-based correlation model to process the upsampled images. However, other approaches for subpixel correlation can be used here. The results produced by the subpixel correlation function 506 include aligned upsampled images.

A super-resolution mapping function 508 processes the aligned upsampled images to generate super-resolution images, meaning images with a resolution higher than the resolution of the original images 502. For instance, the super-resolution mapping function 508 can process the aligned upsampled images to generate super-resolution images using displacement of the images from atmospheric and target motion to fill in subpixel details. Various techniques for combining image data to produce super-resolution images are known in the art, and other techniques are sure to be developed in the future. In some embodiments, the super-resolution mapping function 508 integrates the aligned upsampled images received over time to produce the super-resolution images.

One example process that can be performed by certain implementations of the super-resolution mapping function 508 involves the following operations. In this process, aligned upsampled images are received by the super-resolution mapping function 508 and represent images captured of a target 104 as illuminated by TIL energy and then upsampled and aligned at the subpixel level as described above. Multiple initial aligned upsampled images are received by the super-resolution mapping function 508 and combined to produce a high-resolution reference image. The high-resolution reference image represents a super-resolution image that is generated based on the initial aligned upsampled images, such as via integration of those images. Additional aligned upsampled images are received by the super-resolution mapping function 508 and processed with a fine correlation target tracker that registers each additional image to the high-resolution reference image. The high-resolution reference image is updated with the additional registered images over time, and older images used to produce the high-resolution reference image can be forgotten over time, such as by using a recursive weighting factor or other technique. In this way, a super-resolution imagery template can be recursively updated to support functions such as shift correlation.

The super-resolution images are processed using an edge segmentation function 510, which identifies edges or other features of at least one target 104 contained in the images. Various techniques for edge detection are known in the art, and other techniques are sure to be developed in the future. In some embodiments, the edge segmentation function 510 identifies multiple edges of at least one target 104 in the super-resolution images. This allows an aimpoint on a target 104 to be determined based on an analysis of the entire shape of the target 104, rather than merely based on the leading edge of the target 104. Note that the edge detection performed here can identify linear edges as well as nonlinear edges of at least one target 104. The results produced by the edge segmentation function 510 include a set of edge locations (such as top, left, right, and bottom edges) for one or more targets 104 in the super-resolution image(s).

One example process that can be performed by certain implementations of the edge segmentation function 510 involves the following operations. In this process, the edge segmentation function 510 performs edge filtering for each of at least one target 104 in one or more super-resolution images in multiple directions. For example, two directions may include the horizontal direction and the vertical direction in the super-resolution images, although other directions (which are typically orthogonal to each other) may be used. The edge filtering in different directions leads to the creation of multiple edge-filtered images. The edge-filtered images can be thresholded, such as by comparing the edge filtering results in the images to a threshold value and discarding edge filtering results not exceeding the threshold. The thresholded edge-filtered images are merged together, such as by performing a logical OR operation, to create a binary edge detection map. Additional nonlinear morphological processing can be applied to thin out the binary edge detection map and various edges of each target 104 can be identified from the morphologically-filtered imagery. In some cases, the edges may include top, left, right, and bottom edges of a target 104, although this is for illustration only. In some embodiments, the left and right edges can be identified together, and the top and bottom edges can be identified together. In particular embodiments, each pair of edges (such as left and right or top and bottom) can be identified by using histogram binning and identifying a median edge location in the morphologically-filtered imagery for each of the edges in the pair. This helps to filter out noise and false edge detections, and the same process can occur for each pair of edges.

An aimpoint recognition function 512 uses this information to identify one or more selected aimpoints on at least one target 104. For example, the aimpoint recognition function 512 may identify a desired aimpoint for the HEL beam 106 on a target 104 and optionally a desired aimpoint for the BIL beam 110 on the target 104. The aimpoint recognition function 512 can enable automatic selection of at least one aimpoint on a target 104, which may be based on various factors (such as the visible profile of the target 104 relative to the laser system 102).

In some embodiments, the aimpoint recognition function 512 can select the aimpoint as the centroid of the target 104, where the centroid is calculated based on the detected edges of the target 104 in one or more super-resolution images. In particular embodiments, the aimpoint recognition function 512 can define the aimpoint on a target 104 based on a box geometry defined by the identified edges of that target 104. Note, however, that the identified edges of a target 104 may be used in any other suitable manner to select an aimpoint for that target 104 and can include more complex target edge geometries for different target types.

Moreover, as the aimpoint processing algorithm 500 continues to receive and process additional images 502, the aimpoint recognition function 512 can continue to update the aimpoint on a target 104 based on updated or new super-resolution images. Among other things, this allows the aimpoint processing algorithm 500 to make adjustments to the aimpoint as the target 104 moves. Ideally, this helps to keep the HEL beam 106 at substantially the same location on the target 104, which increases or maximizes the effectiveness of the HEL beam 106 on the target 104.

FIG. 6 illustrates an example overall processing algorithm 600 that can be performed as part of the FTT function 412 and/or other functions in the control system 400 or in other system used for targeting or aiming. In particular, FIG. 6 illustrates a processing algorithm 600 in which the aimpoint processing algorithm 500 of FIG. 5 may be used. As shown in FIG. 6, the processing algorithm 600 includes an acquisition and tracking path 602 and a high-speed fine pointing path 604. The acquisition and tracking path 602 generally operates to acquire one or more targets 104 and to track the path(s) of the target(s) 104. The high-speed fine pointing path 604 generally operates to identify an aimpoint on at least one target 104 and to adjust a high-energy laser system 102 or other system based on the identified aimpoint.

In this example, the acquisition and tracking path 602 receives input from an MWIR camera (such as the infrared camera 390), and the high-speed fine pointing path 604 receives input from an SWIR camera (such as the imaging sensor 228 or 378), although other or additional input may be used here. Note that in some embodiments, images from the SWIR camera can be received at a higher rate than images from the MWIR camera. This may allow, for instance, the high-speed fine pointing path 604 to make more rapid adjustments to the aimpoint on a target 104.

The acquisition and tracking path 602 includes a spatial filter 606, which receives images from the MWIR camera or other source. The spatial filter 606 operates to remove the background from the images in order to support the identification of one or more moving targets 104 in the images. A detection/segmentation function 608 processes the filtered images from the spatial filter 606 in order to identify one or more targets 104 in the images and to generate segmentation masks that relate different pixels in the images with different objects in the images. An association function 610 processes the outputs from the detection/segmentation function 608 in order to determine when at least one target 104 is present in multiple captured images and to associate each target 104 with its associated pixels in the images.

A target tracking function 612 uses the outputs from the association function 610 to track at least one target 104 over time and to predict (based on received images) where that target 104 is likely to be located in future images. In some embodiments, the target tracking function 612 can use EKF tracking to predict, based on prior images, where at least one target 104 is expected to move going forward. The predicted location of a target 104 can be used by a gimbal controller 614, which controls the direction in which a gimbal (such as the multi-axis gimbal 112 or the gimbals 339-340) is pointing a laser system 102 or other system be aimed. The gimbal controller 614 may, for instance, implement the gimbal pointing function 414 described above. The predicted location of a target 104 can also be provided to the TSE function 410 for updating the state of the associated target 104.

The high-speed fine pointing path 604 here includes a non-uniformity correction function 615, which can be used to correct for non-uniform intensities in the incoming images from the SWIR camera or other source. This may be necessary or desirable since the incoming images can be captured as a target 104 moves, leading to differences in the intensities of the incoming images. A target detection function 616 receives the pre-processed images from the non-uniformity correction function 615 and analyzes the images to identify one or more targets 104 in the images. The target detection function 616 can use any suitable technique to identify one or more targets 104, and this may be based at least partially on user input.

A target mask temporal integration function 618 identifies a mask for each identified target 104 in the incoming images. Each mask can identify the portion of each image associated with a target 104. In some embodiments, the target mask temporal integration function 618 may be implemented using the upsample function 504, subpixel correlation function 506, super-resolution mapping function 508, and edge segmentation function 510 described above. Thus, each mask can be defined by the identified edges of the associated target 104.

The outputs from the target mask temporal integration function 618 are provided to an aimpoint recognition function 620, which identifies the aimpoint on at least one target 104 (such as for an HEL beam 106). In some embodiments, the aimpoint recognition function 620 may be implemented using the aimpoint recognition function 512 described above.

In some embodiments, an HEL "on" detection function 622 can be used to detect when an HEL beam 106 is being generated and transmitted towards a target 104. This may be useful since the HEL beam 106 can cause bright flashes of light when it strikes the target 104. When this occurs, the gain can be reduced in the images being processed, and certain areas of the images can be excluded from processing (such as integration) to account for this. An identified aimpoint from the aimpoint recognition function 620 is provided to a target tracking function 624, which tracks the aimpoint over time and predicts (based on prior aimpoint determinations) where the aimpoint is likely to be located in the future. In some embodiments, the target tracking function 624 can use EKF tracking to predict the behavior of the aimpoint.

The high-speed fine pointing path 604 here also includes a correlation function 626, which also receives the pre-processed images from the non-uniformity correction function 615. The correlation function 626 processes the images to identify frame-to-frame shifts in the position of at least one target 104 between different ones of the pre-processed images. The frame-to-frame shifts in the position of a target 104 can be combined (via a combination function 628) with the aimpoint that is output from the target tracking function 624. The combination function 628 therefore generates output values defining how an HEL beam 106 or other system should be moved, such as to maintain the HEL beam 106 substantially at the same position on the target 104. The combination function 628 is also able to receive a manual offset from a user that allows manual adjustment of the aimpoint. The outputs from the combination function 628 can be used by an FSM controller 630, which controls one or more fast steering mirrors 212, 214, 218, 220, 326, 328, 342, 348, 354, 364 and/or the high-speed mirror 224. The FSM controller 630 may, for instance, implement the pointing functions 422 and 424 described above.

In this example, an identified aimpoint from the aimpoint recognition function 620 can be provided to the target detection function 616 and the correlation function 626. This may allow, for example, the target detection function 616 to search for a target 104 within a specified area around the identified aimpoint in additional pre-processed images. This may also allow the correlation function 626 to identify frame-to-frame shifts in the position of the target 104 in specific portions of additional pre-processed images.

A reacquisition function 632 can be used in the processing algorithm 600 to support the reacquisition of a target 104 by the target detection function 616, such as when an SWIR tracker breaks lock on the target 104. In this example, images from two different imaging sensors (the MWIR camera and the SWIR camera) are being processed, so it is possible to use the position of a target 104 detected using images from one imaging sensor to identify the position of the same target 104 in images from another imaging sensor. The reacquisition function 632 here can therefore provide identified positions of one or more targets 104 to the target detection function 616 for use by the target detection function 616. Among other things, this may help the target detection function 616 to reacquire a specific target 104 that might be lost by the target detection function 616 or the tracking function 624.

Each of the functions 504-512 shown in FIG. 5 and each of the functions 606-612, 615-628, 632 shown in FIG. 6 may be implemented in any suitable manner. For example, one, some, or all of these functions may be implemented using dedicated hardware, such as at least one DSP, FPGA, or ASIC. As another example, one, some, or all of these functions may be implemented using hardware with software/firmware instructions, such as at least one processor that executes software/firmware instructions. A combination of dedicated hardware and hardware with software/firmware can also be used. In general, the processing algorithms 500, 600 are not limited to any specific configuration and can be implemented in any number of ways.

Although FIGS. 4 through 6 illustrate one example of a control system 400 supporting super-resolution automatic target aimpoint recognition and tracking, various changes may be made to FIGS. 4 through 6. For example, the approaches for super-resolution automatic target aimpoint recognition and tracking as described in this patent document are not limited to use with the particular control system 400 shown in FIGS. 4 through 6.

Figure 7:
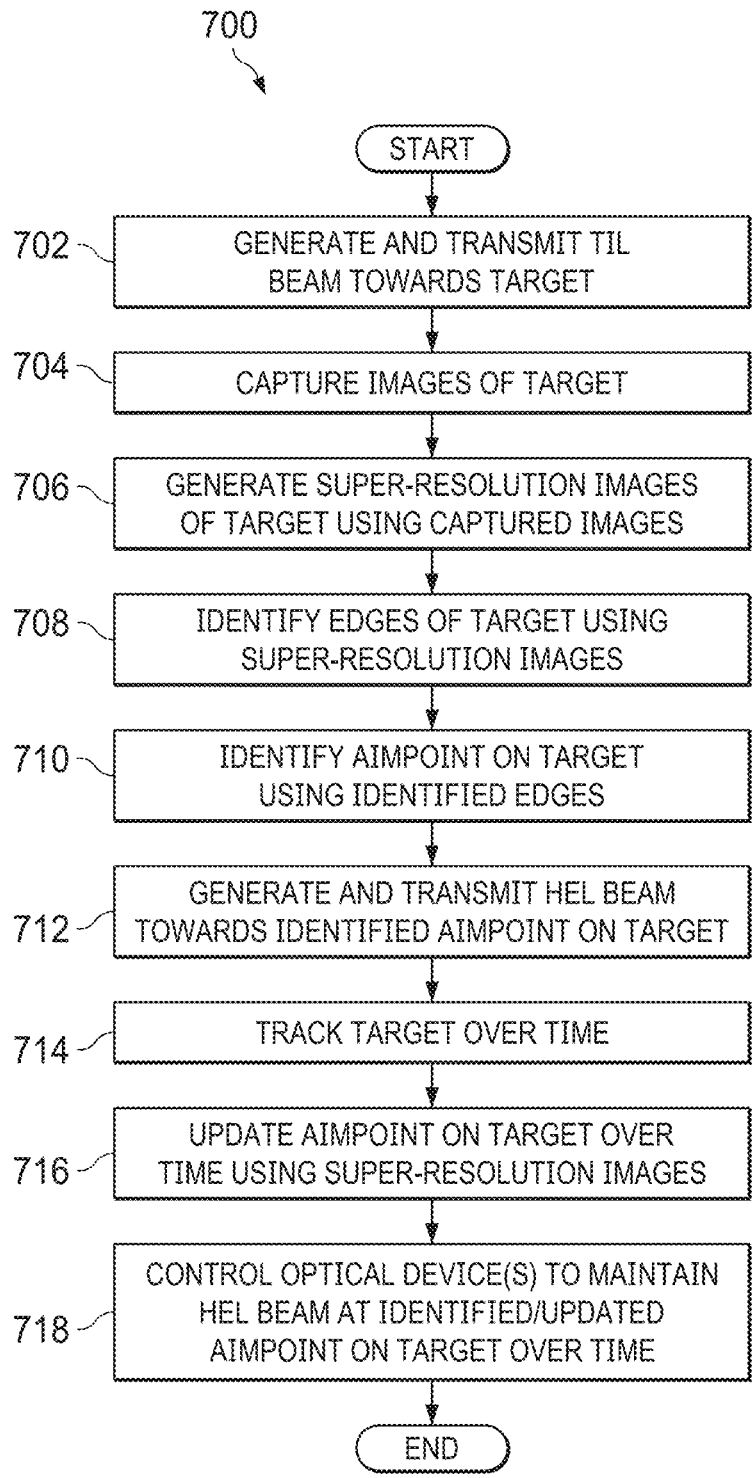
FIG. 7 illustrates an example method for super-resolution automatic target aimpoint recognition and tracking according to this disclosure.

FIG. 7 illustrates an example method 700 for super-resolution automatic target aimpoint recognition and tracking according to this disclosure. For ease of explanation, the method 700 shown in FIG. 7 may be described as involving the use of the high-energy laser system 102 of FIG. 2 or 3 and the control system 400 of FIGS. 4 through 6 in the system 100 of FIG. 1 to engage a hostile target 104. However, the method 700 may be used with any other suitable high-energy laser system or other system to be aimed, which can be used in any other suitable environment and for any other suitable purpose.

As shown in FIG. 7, a TIL beam is generated and transmitted towards a target at step 702, and images of the target (at least some of which are based on reflected TIL energy) are captured at step 704. This may include, for example, the controller 230 performing the ATC function 404 to identify a target 104 and a coarse track of the target 104. This may also include the target illumination laser 204 or 306 generating the TIL beam 108. This may further include the controller 230 controlling one or more fast steering mirrors 342, 348 or other optical devices to direct the TIL beam 108 towards the target 104. In addition, this may include the imaging sensor 228 or 378 capturing images of the target 104 based on the reflected TIL energy and optionally the digital camera 383 and/or the infrared camera 390 capturing additional images of the target 104. Note that while not shown here, a BIL beam 110 may also be directed towards the target 104 during at least part of this time.

Super-resolution images of the target are generated using at least some of the captured images at step 706, and edges of the target in the super-resolution images are identified at step 708. This may include, for example, the controller 230 performing the upsample function 504, subpixel correlation function 506, super-resolution mapping function 508, and edge segmentation function 510 or the target mask temporal integration function 618 described above. In particular embodiments, this may include the controller 230 combining initial aligned upsampled images to produce a high-resolution reference image, processing additional aligned upsampled images with a fine correlation target tracker to register each additional image to the reference image, updating the reference image with the additional registered images over time, and forgetting older images used to produce the reference image over time. Also, in some embodiments, this may include the controller 230 performing edge filtering in multiple directions to create edge-filtered images, thresholding and merging the edge-filtered images to create a binary edge detection map, performing nonlinear morphological processing on the binary edge detection map, and identifying pairs of edges of the target 104 using histogram binning and identifying median edge locations in the morphologically-filtered imagery.

At least one aimpoint on the target is identified using the edges of the target at step 710. This may include, for example, the controller 230 performing the aimpoint recognition function 512 or 620 described above. In particular embodiments, this may include the controller 230 identifying an aimpoint on the target 104 based on a box geometry that is defined by the identified edges of the target 104. Of course, the aimpoint on the target 104 may be identified in any other suitable manner, including those techniques that are based on a template or 3D model of the target 104.

An HEL beam is generated and transmitted towards the aimpoint on the target at step 712. This may include, for example, the high-energy laser 202 or the high-energy laser generator 302 generating the HEL beam 106. This may also include the controller 230 controlling one or more fast steering mirrors 218, 220, 342, 348, 354, 364 and/or the high-speed mirror 224 to direct the HEL beam 106 towards the identified aimpoint on the target 104.

The target is tracked over time at step 714, and the aimpoint is updated over time using additional super-resolution images of the target at step 716. This may include, for example, the controller 230 continuing to perform the upsample function 504, subpixel correlation function 506, super-resolution mapping function 508, edge segmentation function 510, and aimpoint recognition function 512 or the target mask temporal integration function 618 and the aimpoint recognition function 620 described above as more images of the target 104 are captured over time. One or more optical devices are controlled to maintain the HEL beam substantially at the identified and updated aimpoint on the target over time at step 718. This may include, for example, the controller 230 controlling one or more fast steering mirrors 218, 220, 342, 348, 354, 364 and/or the high-speed mirror 224 to maintain the HEL beam 106 pointed at the identified and updated aimpoint on the target 104. This allows the laser system 102 to continue tracking and engaging the target 104 over time, ideally keeping the HEL beam 106 at substantially the same location on the target 104 as the target 104 moves.

Although FIG. 7 illustrates one example of a method 700 for super-resolution automatic target aimpoint recognition and tracking, various changes may be made to FIG. 7. For example, while shown as a series of steps, various steps in FIG. 7 can overlap, occur in parallel, occur in a different order, or occur any number of times. Also, while the target aimpoint recognition and tracking functionality is described here as being used with an HEL system, the target aimpoint recognition and tracking functionality may be used in any other suitable system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document.

The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
 at least one imaging sensor configured to capture images of a moving target over a time period at a specified rate; and
 at least one controller configured to:
  upsample the captured images using interpolation of image data in the captured images to produce upsampled images of the moving target, the upsampled images having a higher resolution than the captured images, wherein the image data varies among the captured images due to movement of the moving target over the time period;
  perform subpixel correlation using the upsampled images to produce aligned upsampled images of the moving target;
  combine the aligned upsampled images to generate super-resolution images of the moving target;
  identify multiple edges of the moving target using the super-resolution images;

identify an aimpoint on the moving target based on the identified edges of the moving target; and update the aimpoint on the moving target as the moving target moves over time;

wherein, to identify the multiple edges of the moving target, the at least one controller is configured to use histogram binning and identify at least one median edge location in morphologically-filtered imagery produced using the super-resolution images; and wherein, to combine the aligned upsampled images, the at least one controller is configured to:

combine multiple initial aligned upsampled images to produce a high-resolution reference image;

register additional aligned upsampled images to the high-resolution reference image; and update the high-resolution reference image with the registered additional aligned upsampled images while applying recursive weighting factors to older aligned upsampled images in order to forget the older aligned upsampled images over time.

2. The system of claim 1, wherein:

the system further comprises a target illumination laser (TIL) configured to generate a TIL beam that illuminates the moving target; and the at least one imaging sensor is configured to capture images of the moving target containing reflected TIL energy.

3. The system of claim 1, wherein, to identify the multiple edges of the moving target, the at least one controller is further configured to:

perform edge filtering in multiple directions in one or more of the super-resolution images to produce multiple edge-filtered images;

apply a threshold to the edge-filtered images to produce thresholded edge-filtered images;

merge the thresholded edge-filtered images to produce a binary edge detection map;

perform nonlinear morphological processing on the binary edge detection map to produce the morphologically-filtered imagery; and identify the edges of the moving target using the at least one median edge location in the morphologically-filtered imagery.

4. The system of claim 1, wherein the at least one controller is further configured to:

identify frame-to-frame shifts associated with the moving target in the captured images; and adjust the identified aimpoint based on the frame-to-frame shifts.

5. The system of claim 1, wherein:

the system further comprises a high-energy laser (HEL) configured to generate an HEL beam that is directed towards the moving target; and the at least one controller is further configured to adjust one or more optical devices to direct the HEL beam at the identified aimpoint on the moving target.

6. At least one non-transitory computer readable medium containing instructions that when executed cause at least one processor to:

obtain captured images of a moving target over a time period at a specified rate;

upsample the captured images using interpolation of image data in the captured images to produce upsampled images of the moving target, the upsampled images having a higher resolution than the captured images, wherein the image data varies among the captured images due to movement of the moving target over the time period;

perform subpixel correlation using the upsampled images to produce aligned upsampled images of the moving target;

combine the aligned upsampled images to generate super-resolution images of the moving target;

identify multiple edges of the moving target using the super-resolution images;

identify an aimpoint on the moving target based on the identified edges of the moving target; and update the aimpoint on the moving target as the moving target moves over time;

wherein the instructions that when executed cause the at least one processor to identify the multiple edges of the moving target comprise instructions that when executed cause the at least one processor to use histogram binning and identify at least one median edge location in morphologically-filtered imagery produced using the super-resolution images; and wherein the instructions that when executed cause the at least one processor to combine the aligned upsampled images comprise instructions that when executed cause the at least one processor to:

combine multiple initial aligned upsampled images to produce a high-resolution reference image;

register additional aligned upsampled images to the high-resolution reference image; and update the high-resolution reference image with the registered additional aligned upsampled images while applying recursive weighting factors to older aligned upsampled images in order to forget the older aligned upsampled images over time.

7. The at least one non-transitory computer readable medium of claim 6, wherein the images of the moving target contain target illumination laser (TIL) energy reflected from the moving target.

8. The at least one non-transitory computer readable medium of claim 6, wherein the instructions that cause the at least one processor to identify the multiple edges of the moving target further comprise:

instructions that when executed cause the at least one processor to:

perform edge filtering in multiple directions in one or more of the super-resolution images to produce multiple edge-filtered images;

apply a threshold to the edge-filtered images to produce thresholded edge-filtered images;

merge the thresholded edge-filtered images to produce a binary edge detection map;

perform nonlinear morphological processing on the binary edge detection map to produce the morphologically-filtered imagery; and identify the edges of the moving target using the at least one median edge location in the morphologically-filtered imagery.

9. The at least one non-transitory computer readable medium of claim 6, further containing instructions that when executed cause the at least one processor to:

identify frame-to-frame shifts associated with the moving target in the captured images; and adjust the identified aimpoint based on the frame-to-frame shifts.

10. The at least one non-transitory computer readable medium of claim 6, further containing instructions that when executed cause the at least one processor to:

adjust one or more optical devices to direct a high-energy laser (HEL) beam at the identified aimpoint on the moving target.

11. A method comprising:

obtaining captured images of a moving target over a time period at a specified rate;

upsampling the captured images using interpolation of image data in the captured images to produce upsampled images of the moving target, the upsampled images having a higher resolution than the captured images, wherein the image data varies among the captured images due to movement of the moving target over the time period;

performing subpixel correlation using the upsampled images to produce aligned upsampled images of the moving target;

combining the aligned upsampled images to generate super-resolution images of the moving target;

identifying multiple edges of the moving target using the super-resolution images;

identifying an aimpoint on the moving target based on the identified edges of the moving target; and updating the aimpoint on the moving target as the moving target moves over time;

wherein identifying the multiple edges of the moving target comprises using histogram binning and identifying at least one median edge location in morphologically-filtered imagery produced using the super-resolution images; and wherein combining the aligned upsampled images comprises:

combining multiple initial aligned upsampled images to produce a high-resolution reference image;

registering additional aligned upsampled images to the high-resolution reference image; and updating the high-resolution reference image with the registered additional aligned upsampled images while applying recursive weighting factors to older aligned upsampled images in order to forget the older aligned upsampled images over time.

12. The method of claim 11, wherein identifying the multiple edges of the moving target further comprises:

performing edge filtering in multiple directions in one or more of the super-resolution images to produce multiple edge-filtered images;

applying a threshold to the edge-filtered images to produce thresholded edge-filtered images;

merging the thresholded edge-filtered images to produce a binary edge detection map;

performing nonlinear morphological processing on the binary edge detection map to produce the morphologically-filtered imagery; and identifying the edges of the moving target using the at least one median edge location in the morphologically-filtered imagery.

13. The method of claim 11, further comprising:

generating a target illumination laser (TIL) beam that illuminates the moving target; and capturing images of the moving target containing reflected TIL energy.

14. The method of claim 11, further comprising:

identifying frame-to-frame shifts associated with the moving target in the captured images; and adjusting the identified aimpoint based on the frame-to-frame shifts.

15. The system of claim 1, wherein, to perform subpixel correlation using the upsampled images, the at least one controller is configured to use a maximum a posteriori probability (MAP)-based correlation model to process the upsampled images.

16. The system of claim 1, wherein the at least one imaging sensor comprises an infrared camera.

17. The system of claim 1, wherein the moving target comprises an airborne vehicle.

18. The at least one non-transitory computer readable medium of claim 6, wherein the captured images of the moving target are obtained using an infrared camera.

19. The at least one non-transitory computer readable medium of claim 6, wherein the moving target comprises an airborne vehicle.

20. The method of claim 11, wherein the captured images of the moving target are obtained using an infrared camera.

21. The method of claim 11, wherein the moving target comprises an airborne vehicle.

* * * * *

UNITED STATES PATENT AND TRADEMARK OFFICE
CERTIFICATE OF CORRECTION

PATENT NO. : 11,900,562 B2  
APPLICATION NO. : 16/702279  
DATED : February 13, 2024  
INVENTOR(S) : Braunreiter Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 211 days.

Signed and Sealed this  
First Day of July, 2025

Coke Morgan Stewart  
*Acting Director of the United States Patent and Trademark Office*